(12) United States Patent
Matheis

(10) Patent No.: US 7,731,458 B2
(45) Date of Patent: Jun. 8, 2010

(54) CLAMPING ELEMENT FOR TOOL HOLDERS

(75) Inventor: Klaus Matheis, Sauldorf (DE)

(73) Assignee: Joerg Guehring, Albstadt (DE)

( * ) Notice: Subject to any disclaimer, the term of this patent is extended or adjusted under 35 U.S.C. 154(b) by 0 days.

(21) Appl. No.: 12/356,876

(22) Filed: Jan. 21, 2009

(65) Prior Publication Data

US 2009/0129883 A1 May 21, 2009

Related U.S. Application Data

(63) Continuation of application No. 11/503,866, filed on Aug. 14, 2006, now abandoned, which is a continuation of application No. PCT/DE2005/000230, filed on Feb. 10, 2005.

(30) Foreign Application Priority Data

Feb. 12, 2004 (DE) .................. 10 2004 009 217

(51) Int. Cl.
*B23B 31/107* (2006.01)
(52) U.S. Cl. .................. 409/234; 279/20; 279/2.19; 408/240; 409/136
(58) Field of Classification Search .................. 279/20, 279/81, 86, 2.19; 408/57, 59, 240, 239 R; 409/136, 232, 234
See application file for complete search history.

(56) References Cited

U.S. PATENT DOCUMENTS

| 1,337,313 | A | 4/1920 | Groene |
| 4,573,824 | A | 3/1986 | Ehle |
| 4,575,293 | A | 3/1986 | Berti |
| 4,715,753 | A | 12/1987 | Tack |
| 4,784,542 | A | 11/1988 | Tack et al. |
| 4,797,041 | A | 1/1989 | Glaser |

(Continued)

FOREIGN PATENT DOCUMENTS

CA 2064565 3/1991

(Continued)

OTHER PUBLICATIONS

Gühring 93, Das Modulare Werkzeugsystem GM 300, The Modular Tooling System GM 300 for machining centers, transfer lines and turning machines, 1993, pp. 1-52.

(Continued)

*Primary Examiner*—Daniel W Howell
(74) *Attorney, Agent, or Firm*—Burr & Brown

(57) ABSTRACT

The invention concerns a clamping element of a coupling device for releasably but axially and rotationally fixing tool components for dry machining (MMS technology) and for wet machining. The element provides a friction-type connection between the components to be coupled. A cooling tube is arranged at the center of the coupling device. The spindle is provided with an elongated hole run through which cooling tube passes. A variable contour between the base body and the clamping segment enables an increase in distribution of forces for the support of the clamping segments. The novel geometry of the clamping segments results in novel contours in the base body with smoother transitions, hence a better force distribution, thereby reducing material breakage and a more reliable and robust clamping. By virtue of their novel geometry, the clamping segments have an increased surface enabling larger clamping screws to be used.

12 Claims, 2 Drawing Sheets

U.S. PATENT DOCUMENTS

| | | | |
|---|---|---|---|
| 4,804,301 A | 2/1989 | Hunt | |
| 4,813,829 A | 3/1989 | Koppelmann | |
| 4,863,323 A | 9/1989 | Glaser | |
| 4,895,474 A | 1/1990 | Eckle | |
| 4,913,607 A | 4/1990 | von Haas | |
| 4,976,574 A | 12/1990 | Muendlein et al. | |
| 4,981,057 A | 1/1991 | von Haas et al. | |
| 5,035,557 A | 7/1991 | Kohlbauer et al. | |
| 5,137,401 A | 8/1992 | Muendlein et al. | |
| 5,150,995 A | 9/1992 | Reinauer | |
| 5,243,884 A | 9/1993 | Haga et al. | |
| 5,346,344 A | 9/1994 | Kress et al. | |
| 5,466,102 A * | 11/1995 | Erickson | 409/232 |
| 5,492,441 A | 2/1996 | Schuerfeld | |
| 5,559,146 A | 9/1996 | Sablon | |
| 5,599,146 A | 2/1997 | Scheer | |
| 5,788,433 A | 8/1998 | Grund et al. | |
| 5,957,639 A | 9/1999 | Freyermuth et al. | |
| 6,457,920 B1 | 10/2002 | Kleiner | |
| 6,579,027 B1 | 6/2003 | Stolz | |
| 6,619,896 B1 | 9/2003 | Spors et al. | |
| 6,648,565 B2 | 11/2003 | Schweizer | |
| 6,796,756 B1 | 9/2004 | Kleiner | |
| 7,422,219 B2 | 9/2008 | Kress et al. | |
| 2001/0010785 A1 | 8/2001 | Cirino | |
| 2002/0015625 A1 | 2/2002 | Schweizer | |
| 2006/0228183 A1 | 10/2006 | Kress et al. | |

FOREIGN PATENT DOCUMENTS

| | | |
|---|---|---|
| CA | 2124803 | 6/1993 |
| CA | 2142447 | 3/1994 |
| CA | 2 318 109 A1 | 7/1999 |
| DE | 8106317 U1 | 8/1982 |
| DE | 3 410 563 | 9/1985 |
| DE | 232 001 | 1/1986 |
| DE | 35 07 225 A1 | 9/1986 |
| DE | 3 616 230 | 11/1987 |
| DE | 37 06 534 C1 | 4/1988 |
| DE | 37 08 746 C1 | 6/1988 |
| DE | 37 25 229 C1 | 12/1988 |
| DE | 39 08 500 | 10/1989 |
| DE | 275 426 | 1/1990 |
| DE | 38 37 007 | 5/1990 |
| DE | 39 04 259 | 8/1990 |
| DE | 39 39 227 | 10/1990 |
| DE | 41 10 720 | 10/1992 |
| DE | 41 15 992 A1 | 11/1992 |
| DE | 42 21 735 | 3/1993 |
| DE | 42 11 034 | 10/1993 |
| DE | 42 17 657 | 12/1993 |
| DE | 93 11 531 U1 | 12/1993 |
| DE | 42 20 873 | 1/1994 |
| DE | 4228558 C1 | 2/1994 |
| DE | 297 04 440 U1 | 5/1997 |
| DE | 196 21 240 A1 | 11/1997 |
| DE | 197 53 663 A1 | 6/1999 |
| DE | 198 60 184 | 8/1999 |
| DE | 198 36 912 A1 | 2/2000 |
| DE | 199 07 026 A1 | 8/2000 |
| DE | 199 20 748 | 11/2000 |
| DE | 100 30 844 A1 | 1/2002 |
| DE | 10040473 A1 | 2/2002 |
| DE | 10 2004 011 204 A1 | 5/2005 |
| EP | 0 291 048 | 11/1988 |
| EP | 0 295 315 A1 | 12/1988 |
| EP | 0 172 850 | 4/1989 |
| EP | 0 310 942 | 4/1989 |
| EP | 0 409 973 | 1/1991 |
| EP | 0547 049 B1 | 6/1993 |
| EP | 0563979 B1 | 10/1993 |
| EP | 1 035 934 | 9/2000 |
| EP | 1 175 272 | 1/2002 |
| EP | 1 226 894 A2 | 7/2002 |
| EP | 1 660 262 B1 | 5/2006 |
| GB | 2 094 191 A | 9/1982 |
| GB | 2 171 937 | 9/1986 |
| JP | 02-071915 | 3/1990 |
| JP | 05253712 A | 10/1993 |
| JP | 06-008046 | 1/1994 |
| JP | 08-001425 | 1/1996 |
| JP | 09136204 A | 5/1997 |
| JP | 11-019839 | 1/1999 |
| JP | 2001087915 A | 4/2001 |
| WO | 91/03347 | 3/1991 |
| WO | 93/10930 | 6/1993 |
| WO | 94/05451 | 3/1994 |
| WO | 99/37428 | 7/1999 |
| WO | 2005/028148 | 3/2005 |

OTHER PUBLICATIONS

Gühring 98, Das Modulare Werkzeugsystem GM 300, nach DIN 69 893, für Bearbeitungszentren and Transferstraβen, Manual, 007096/9830-V-06, 1998, pp. 1-68.

Gühring 2000, Das Modulare Werkzeugsystem GM 300 nach DIN 69 893, für Bearbeitungszentren and Transferstraβen, Manual, 077 096/0033-IV-06, 2000, pp. 1-72.

Gühring '03, GM 300 Werkzeugaufnahmen, Spanner und Zubehör, 077 096/0426-III-25, Aug. 2003/2, pp. 1-100.

Gühring'08, GM 300 MMS-Programm, Innovative Lösungen von der Spindel bis zur Werkzeugschneide auch für konventionelle Kühlschmierung, 106 919/0873-VIII-22, 2008, pp. 1-28.

Gühring '05, GM 300, HSK-/SK-Werkzeugaufnahmen, HSK-Spanner und Zubehör, nach ISO 12164, DIN 69893 und DIN 69871, für Transferstraβen, Bearbeitungs-und Drehzentren, 096/0534-III-25, Aug. 2005, pp. 1-129.

Gühring 2001, GM 300 Das Modulare Werkzeugsystem, the Modular Tooling System, to DIN 69 893, for machining centers, transfer lines and turning centers, 077096/0126-VII-06, 2001, pp. 1-88.

Gühring, Das Modulare Werkzeugsystem GM 300, The Modular Tooling System GM 300 for machining centers and turning machines, 073759/9140-VIII-14, 1992, pp. 1-12.

Bohrmeister Gühring 36, Infos über Bohren—Gewindeschneiden Reiben—Senken—Fräsen—Drehen, Das Modulare Werkzeugsystem GM 300, 1991, pp. 1-20.

Gühring 98, Das Modulares Werkzeugsystem GM 300, Preisliste 1998, 103574/9841-VI-06, pp. 1-12.

Gühring 99, Das Modulare Werkzeugsystem GM 300, Preisliste 1999, 103574/9932-VI-06, pp. 1-15.

Gühring, Das Modulare Werkzeugsystem GM 300, The Modular Tooling System GM 300 to DIN 69 893 for machining centers, transfer lines and turning machines, 073759/9331-X-14, 1993, pp. 1-16.

Gühring, Das Werkzeugsystem GM 300, The Tooling System GM 300 for Machining Centers and Turning Machines, 077 096/9132-V-06, (pp. 31-34 or 43-46) pp. 1-30, 35-42 and 47-82 (72 pages total).

Gühring, Das Modulare Werkzeug-Spannsystem GM 300, 9238-VIII-14, 1992, pp. 1-4.

Gühring, Das Modulare Werkzeugsystem GM 300, Preisliste 2000, 103574/0034-IV-06, Jan. 7, 2000, pp. 1-16.

Prof. Dr.-Ing. W. Hellwig, *Diplomarbeit*, Fachhochschule Konstanz, Hochschule für Technik, Aug. 1990.

\* cited by examiner

US 7,731,458 B2

CLAMPING ELEMENT FOR TOOL HOLDERS

CROSS-REFERENCE TO RELATED APPLICATION

This application is a continuation of U.S. patent application Ser. No. 11/503,866, filed Aug. 14, 2006, which is a Continuation of International Application No. PCT/DE2005/000230 having an international filing date of Feb. 10, 2005, published in German on Aug. 25, 2005 under PCT Article 21(2), the entireties of which are incorporated herein by reference.

FIELD OF THE INVENTION

The invention relates to a clamping element of a coupling device for releasably and fixedly fitting components together for rotation about an axis. In particular, components such as tool components, two corresponding supporting parts, etc. can be fitted onto a tool base receiving element, for example.

BACKGROUND OF THE INVENTION

The clamping system relates to parts rotated at high speeds and to the releasable connection between two components, as disclosed in patent specification DE 42 11 034. A highly efficient coupling for the area of the interface between the machine tool and tool module is described in EP 0291 048 B1 and EP 0409972 B1, as well as in EP 01035934 B1 and EP 1175272 B1. As can be seen in these documents, it is important that the components are connected reliably and are solidly clamped together.

SUMMARY OF THE INVENTION

The invention relates to coupling devices used between a work or work support part (e.g. a tool system module in the form of a tool base receiving element) and associated handling device (e.g. a machine tool designed as a drilling, turning or milling machine).

In the present case, the coupling device is used both for stationary and for moving, e.g. turning work or work support parts (e.g. tool system modules). The clamping system is used for the releasable connection of two, preferably rotationally symmetrical, components, some of which have a preferably cylindrical or conical hollow shaft, and others having a corresponding receiving section for receiving the hollow shaft so that there is an exact fit.

The clamping system comprises a clamping device arranged concentrically in a receiving section. At least a first end of the clamping device extends into the receiving section of one of the components when both components are joined together. The clamping device has a hollow shaft, a coolant tube, at least two clamping segments that can be moved in opposite directions, a spindle between the clamping segments, and an actuating device driving the clamping segments. The clamping means of the clamping device allows the clamping segments to be moved synchronously in and out of engagement with an undercut clamping shoulder (recess) of the hollow shaft. Each of the recesses has a bottom surface and opposing first and second walls. Each of the walls has a height above the bottom surface that varies up to a portion of greatest height. The first wall has a rounded or chamfered contour such that the distance between the walls increase to a maximum near the portion of greatest height, and the first wall is closer to the first end of the shaft than the second wall. A first aperture extends along at least a portion of the shaft, and a second aperture extends through the shaft connecting the bottom surfaces of the recesses. The spindle is located within the second aperture of the shaft, and the spindle has an aperture perpendicular to the length. The coolant tube is located within the first aperture of the shaft and within the aperture of the spindle. The clamping means generates a contact force between flat surfaces of the components to be connected. According to the invention, the clamping segments have a radially sliding movement.

According to one embodiment of the invention, each of the clamping segments have an exposed edge that is rounded on a side facing a direction from which the tool is brought into engagement with a mating part. According to another embodiment of the invention, the exposed edge of the first surface of the segment is chamfered at an angle of 30° to 80° to the longitudinal axis. According to another embodiment of the invention, the exposed edge of the first surface of each of the segments is rounded and chamfered at an angle of 30° to 80° to said longitudinal axis.

According to one embodiment of the invention, the actuating device driving the clamping segments is a clamping screw rotationally engaged with one of the segments and engaged with the spindle. Preferably, the clamping screw, the spindle and the first segment are radially offset through a rotation of the screw.

According to one embodiment of the invention, a transition between the first side wall of each recess and the bottom surface is rounded. An edge of a first surface of the segment corresponding to the transition between the first side of the recess and the bottom surface of the recess is rounded.

According to one embodiment of the invention, an edge of the hollow shaft between the first end and the diametral outer surface is chamfered at an angle of 30° to 80° to the longitudinal axis. According to another embodiment of the invention, an edge of the hollow shaft between the first end and the diametral outer surface is rounded and chamfered at an angle of 30° to 80° to the longitudinal axis.

BRIEF DESCRIPTION OF THE DRAWINGS

For a fuller understanding of the nature and objects of the invention, reference should be made to the following detailed description, read in connection with the accompanying drawings in which.

DETAILED DESCRIPTION OF THE INVENTION

Figure 1:
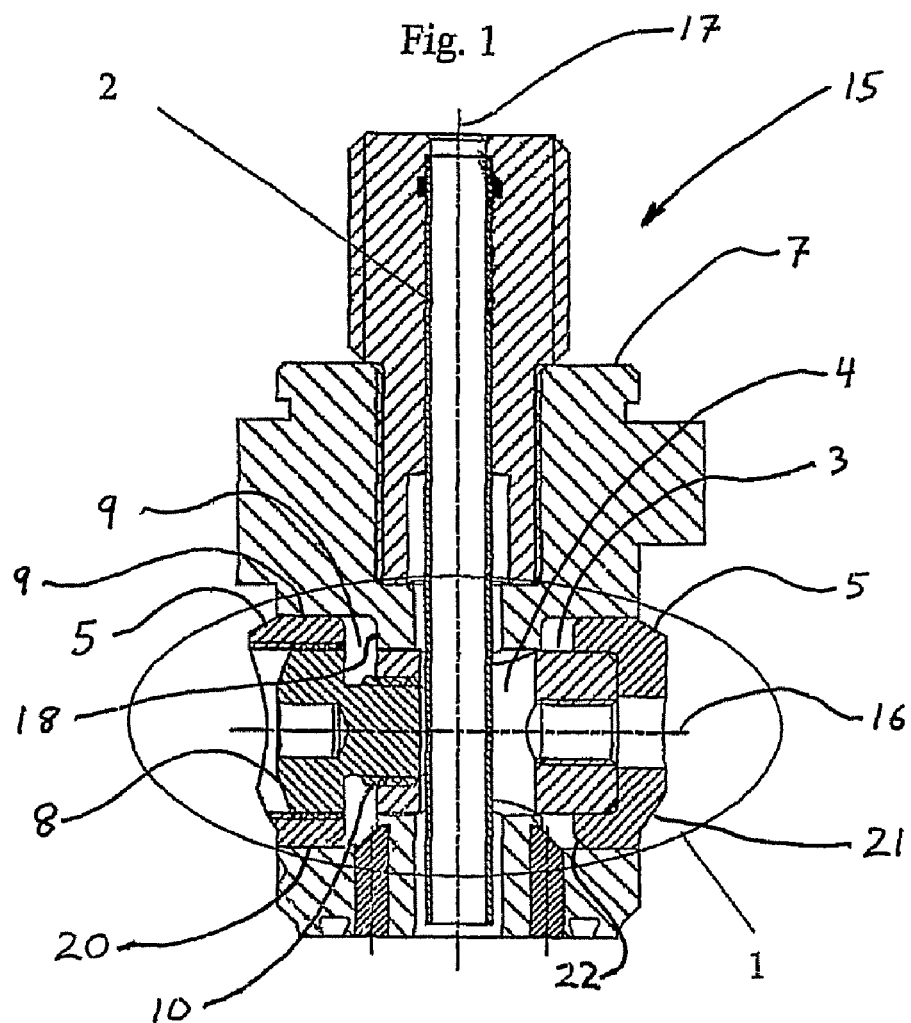
FIG. 1 is a sectional view taken through a center line as shown in FIG. 2 of a clamping device made in accordance with a first embodiment of the present invention.
Figure 2:
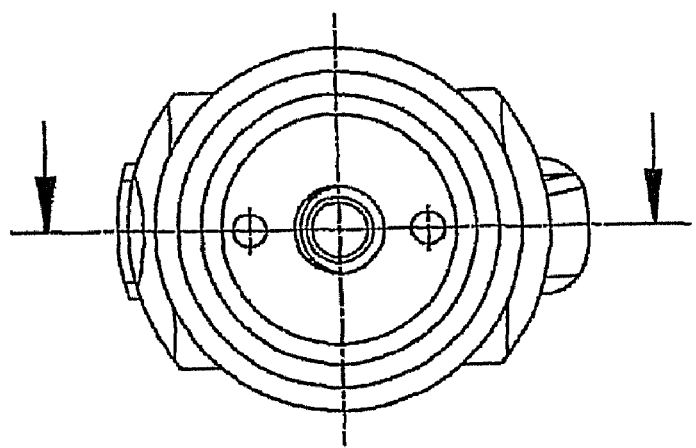
FIG. 2 is a bottom view of the clamping device shown in FIG. 1.

According to the invention a clamping device 15 includes a clamping element 1. The clamping element 1 allows the clamping device 15 to be used for dry machining (e.g. MMS technology), as well as for wet machining with the clamping device being brought into engagement with a mating part in a direction 12, as shown in FIG. 1. The clamping element 1 provides an optimum friction-type connection between two components to be coupled.

As shown in FIGS. 1-4, the clamping element 1 of the clamping device 15 includes two clamping segments 5, one each located in a recess 11 located on a diametral outer surface 26 of a hollow shaft 7. The individual clamping segments 5 are actuated in a radial direction along an axis 16 arranged perpendicular to a longitudinal axis 17 of the hollow shaft 7. The actuation can take place through rotation of a clamping screw 8, which is threaded into one of the clamping segments 5 and a spindle 3.

A cooling tube 2 is arranged centrically in the clamping device 15 to provide coolant for wet machining. The clamping element 1 includes modified geometries to allow for the passage of the coolant tube 2. An elongated hole is formed in the spindle 3 so that the coolant tube 2 can be guided through the hollow shaft 7. Elongated hole 4 in the spindle 3 has a radial clearance, which compensates for the radial deflection 9 of clamping segments 5.

Figure 3:
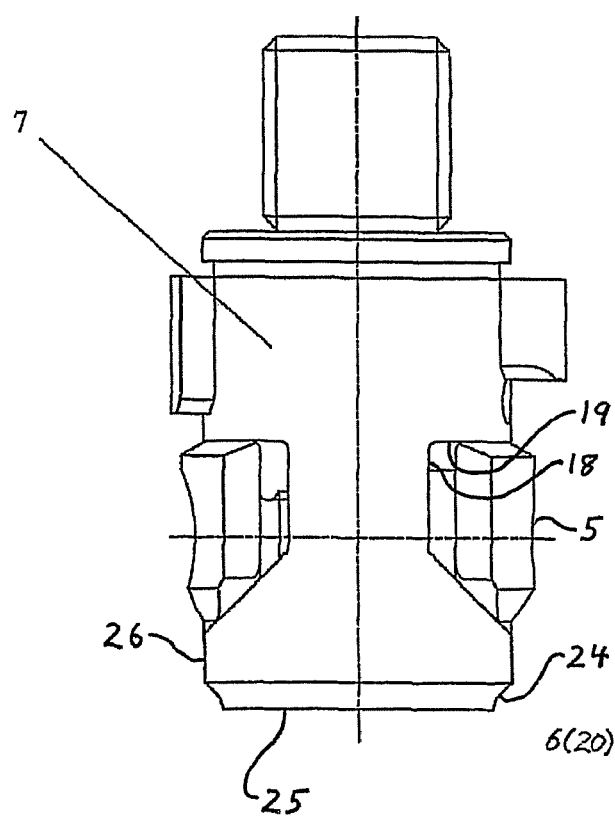
FIG. 3 is a front view of the clamping device shown in FIG. 1.
Figure 4:
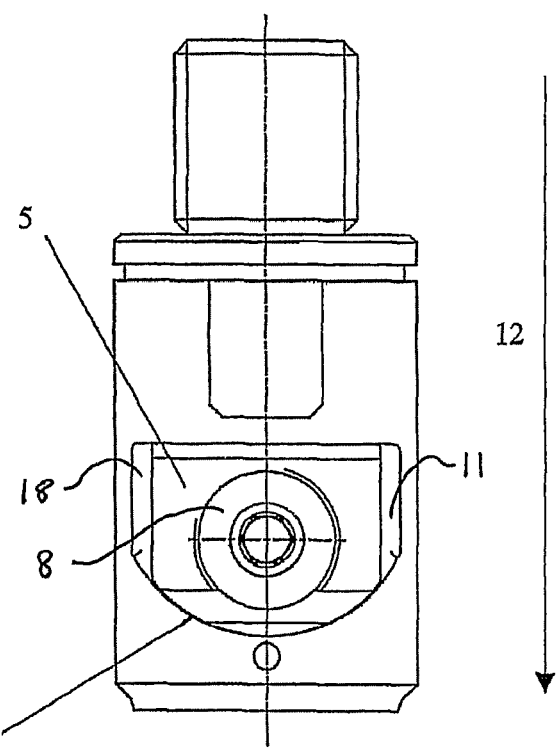
FIG. 4 is a left side view of the clamping device shown in FIG. 1.

Because of the variable contour 6 of the clamping elements 5 between the recesses 11 in the hollow shaft 7 and clamping segments 5, the distribution of forces for supporting the clamping segments 5 is greater. As shown in FIGS. 3 and 4, both a first wall 20 of the recess 11 and a corresponding side of the clamping element 5 share a variable design 6 that can be of a round or chamfered contour. As can be seen in FIG. 1, the first wall 20 and a second wall 19 of the recess 11 are opposed and extend substantially perpendicular to a bottom surface 18 of the recess 11. Further, the rounded or chamfered contour 6 of the first wall 20 of the recess 11 and the corresponding geometrical design of the clamping elements 5 results in novel contours with smoother transitions, and hence better force distribution, thereby reducing material breakage by a multiple factor and guaranteeing reliable or increased clamping. The variable contour 6 results in the distance between the first wall 20 and the second wall 19 increasing (see FIG. 4) as the height of the walls 19, 20 from the bottom surface 18 increases, with the distance being the greatest near a position where the height is the greatest (see FIG. 1).

Because of their variable design 6, the clamping segments 5 have a larger surface enabling larger clamping screws 8 to be fitted therein. As discussed further above, the clamping element 5 is radially offset 9 by the rotation of the clamping screw 8.

As can be seen in FIG. 1, a transition between the first wall 20 and the bottom surface 18 is rounded. Further, an edge 22 of the clamping element 5 corresponding to the transition between the first wall 20 and the bottom surface 18 is rounded.

An exposed edge 21 of each segment 5 is chamfered at an angle of 30° to 80° to the longitudinal axis 17 and/or is rounded. Similarly, an edge 24 of hollow shaft 7 between a first end 25 and the diametral outer surface 26 is chamfered at an angle of 30° to 80° to the longitudinal axis 17 and/or is rounded.

As can be understood from FIG. 1, the spindle 3, which is located between the clamping screw 8 and the clamping segments 5, has more engaged thread turns 10 on the threaded end of the clamping screw 8 when the coupling is clamped, thus increasing clamping safety.

The invention claimed is:

1. A clamping system for releasably connecting a clamping device to an interior of a second component, said clamping device comprising:
    a shaft comprising (i) a length extending along a longitudinal axis of said shaft, (ii) opposing first and second ends; (iii) a diametral outer surface, (iv) a pair of mutually opposing recesses located on said diametral outer surface, each of said recesses having a bottom surface, and opposing first and second walls, each of said walls having a height above said bottom surface that varies up to a portion of greatest height, said first wall having a rounded or chamfered contour such that the distance between said walls increases to a maximum near said portion of greatest height, said first wall being closer to said first end of said shaft than said second wall, (v) a first aperture extending along at least a portion of said length of the shaft, and (vi) a second aperture extending through said shaft connecting said bottom surfaces of said recesses;
    two clamping segments, one slidably mounted within each recess, each of said clamping recesses having opposing first and second opposing outer surfaces that correspond to the first and second walls of said recess, respectively;
    a spindle located within said second aperture of said shaft and located between said two clamping segments, said spindle having a length extending between said two clamping segments and having an aperture perpendicular to said length; and
    a coolant tube located within said first aperture of said shaft and within said aperture of said spindle.

2. The clamping system according to claim 1, wherein an exposed edge of said first surface on each of said segments is rounded on a side facing a direction from which the tool is brought into engagement with a mating part.

3. The clamping system according to claim 1 further comprising at least one clamping screw rotationally engaged with one of said segments and engaged with said spindle.

4. The clamping system according to claim 1, wherein the clamping screw, the spindle and the first segment are radially offset through a rotation of said screw.

5. The clamping system according to claim 1, wherein a transition between said first side wall of each recess and said bottom surface is rounded.

6. The clamping system according to claim 1, wherein an edge of said first surface of each of said segments corresponding to the transition between the first side of the recess and the bottom surface of the recess is rounded.

7. The clamping system according to claim 1, wherein an exposed edge of said first surface of each of said segments is chamfered at an angle of 30° to 80° to said longitudinal axis.

8. The clamping system according to claim 1, wherein an edge of said hollow shaft between said first end and said diametral outer surface is chamfered at an angle of 30° to 80° to said longitudinal axis.

9. The clamping system according to claim 1, wherein an edge of said hollow shaft between said first end and said diametral outer surface is rounded and chamfered at an angle of 30° to 80° to said longitudinal axis.

10. The clamping system according to claim 1, wherein an exposed edge of said first surface of each of said segments is rounded and chamfered at an angle of 30° to 80° to said longitudinal axis.

11. The clamping system according to claim 1, wherein said clamping system and said second component are rotationally symmetrical.

12. The clamping system according to claim 1, wherein said hollow shaft is cylindrical or conical.

* * * * *

UNITED STATES PATENT AND TRADEMARK OFFICE
CERTIFICATE OF CORRECTION

PATENT NO. : 7,731,458 B2 Page 1 of 1
APPLICATION NO. : 12/356876
DATED : June 8, 2010
INVENTOR(S) : Klaus Matheis It is certified that error appears in the above-identified patent and that said Letters Patent is hereby corrected as shown below:

Title Page, Item (56) References Cited, Other Publications
  *Page 2, second to last cited publication:* please change "Gühring, Das Modulare Werkzeugsystem GM 300, Preisliste 2000, 103574/0034-IV-06, Jan. 7, 2000, pp. 1-16"

to

--Gühring 2000, Das Modulare Werkzeugsystem GM 300, Preisliste 2000, 103574/0034-IV-06, Jan. 7, 2000, pp. 1-16--

Signed and Sealed this

Seventeenth Day of August, 2010

David J. Kappos
*Director of the United States Patent and Trademark Office*